(12) United States Patent
Reichhart

(10) Patent No.: US 7,949,623 B2
(45) Date of Patent: May 24, 2011

(54) COMMUNICATION METHOD

(75) Inventor: Thomas Reichhart, Aldenhoven (DE)

(73) Assignee: Hiflex Software GesmbH, Vienna (AT)

( * ) Notice: Subject to any disclaimer, the term of this patent is extended or adjusted under 35 U.S.C. 154(b) by 1020 days.

(21) Appl. No.: 11/720,883

(22) PCT Filed: Dec. 5, 2005

(86) PCT No.: PCT/EP2005/012985
§ 371 (c)(1),
(2), (4) Date: Jun. 5, 2007

(87) PCT Pub. No.: WO2006/061162
PCT Pub. Date: Jun. 15, 2006

(65) Prior Publication Data
US 2009/0319460 A1    Dec. 24, 2009

(30) Foreign Application Priority Data
Dec. 7, 2004 (DE) .......................... 10 2004 059 045

(51) Int. Cl.
*G06F 17/00* (2006.01)
*G06N 5/00* (2006.01)
(52) U.S. Cl. .............................. 706/45; 706/46; 706/47
(58) Field of Classification Search ........................ None
See application file for complete search history.

(56) References Cited

U.S. PATENT DOCUMENTS

| | | | |
|---|---|---|---|
| 5,963,641 A | 10/1999 | Crandall et al. | |
| 6,144,969 A | 11/2000 | Inokuchi et al. | |
| 2002/0171857 A1 | 11/2002 | Hisatomi et al. | |
| 2004/0172634 A1* | 9/2004 | Honda et al. | 718/104 |

FOREIGN PATENT DOCUMENTS

| | | |
|---|---|---|
| DE | 43 28 026 A1 | 3/1995 |
| EP | 1 155 845 A2 | 4/2001 |
| EP | 1 122 652 A | 8/2001 |
| WO | WO 2004/100015 A | 11/2004 |

OTHER PUBLICATIONS

Adobe, "Job Definition Format", pp. 1-17, Mar. 14, 2000.*
Ziljak et al., Vilko, "Modelling and Simulation of Integration of Web System, Digital and Conventional Printing", pp. 1-7, 2002.*
Ziljak et al., Vilko, "Modelling and Simulation as a Planning Method for Printing Houses Modernization with Job Definition Format", pp. 1-4, 2003.*
Anonymous: "Job Definition Format", Mar. 14, 2000.

* cited by examiner

*Primary Examiner* — Jeffrey A Gaffin
*Assistant Examiner* — Adrian L Kennedy
(74) *Attorney, Agent, or Firm* — Von Rohrscheidt Patents

(57) ABSTRACT

Initially a method for communication between a management information system, in which a field content is stored, and an execution system are disclosed, wherein the field content in Job Definition Format is transmitted from the management information system to the execution system, then a method for communication between a source system, in which a field content is stored in a file in Job Definition Format, and an executing system, wherein the field content in Job Definition Format is transmitted by the source system to the execution system, and eventually a communication module, through which a field content in Job Definition Format can be transmitted to an execution system, wherein in order to simplify communications between management information systems or source systems and execution systems in job format, and to render them less error prone, the field content is initially adapted according to a rule specified for the management information system, or the source system, and the execution system is adapted to specified rules and subsequently transmitted to the execution system, or the field content is adapted according to such method before transmission.

22 Claims, No Drawings

COMMUNICATION METHOD

BACKGROUND OF THE INVENTION

The invention initially relates to a communication method between a management information system, in which a field content is stored, and an execution system, wherein the field content is transmitted from the management information system to the execution system in Job Definition Format, then it relates to a communication method between a source system, in which a field content is stored in a file in Job Definition Format, and to an execution system, wherein the field content is transmitted from the source system to the execution system in Job Definition Format, and eventually, to a communication module, through which a field content in Job Definition Format can be transmitted to an execution system.

The Job Definition Format "JDF" (and the job messaging format "JMF" as a subset of JDF) are generally known data formats, which have been developed and are being maintained by the consortium "International Corporation for the Integration of Processes in Prepress, Press, Post Press" ("CIP4-Consortium", www.cip4.org). The development of JDF is based on the objective to standardize the communication between print shop, designer, advertising agency, customer for printed materials, and vendors of subcontractors in the framework of a networked graphic production for all production options and eventualities in a flexible manner without restrictions.

JDF is based on the extensible markup language "XML", a meta language for defining document types, which is also commonly known and was developed by the World Wide Web Consortium ("W3C", www.w3.org), and is intended, according to the CIP4-Consortium, to serve as a standardized data format for describing methods and products, not only in all production areas of a networked print shop, but also particularly in sales, job costing and order processing, production planning and control, in production itself, in preproduction, print, print post processing, and shipping, in the cross sectional areas of materials- and warehouse management, finance and payroll accounting, controlling, cost accounting, and quality insurance.

Through vertical integration of data of the production process, on the one hand, and the accounting areas, on the other hand, JDF is intended to allow a high transparency of all production processes, a standardized documentation of the relevant target- and actual data and an integrated production control, in an understandable and integrated data structure. In particular, an order in JDF format shall only be described once in a format, which all process participants understand, also in external communications with customers, as well as with subcontractors and their execution systems, in man-machine and machine-machine-communications over language and platform boundaries.

Contrary to the philosophy of the CIP4-consortium and the JDF concepts based thereupon, in actual operations of networked printing plants there are multiple restrictions and specific differences with respect to the data formats, which the particular process partners use and understand.

Job data are e.g. being stored in generally known execution systems on commercially available computer components, in particular, on non removable or removable media. Herein, the designation of a job is being used as a directory name, e.g. for structuring the data on the medium. Already depending on the file system used, the characters available for directory names are restricted to different extents. Thus, the known file systems basically do not allow the use of certain special characters in file and directory names.

A restriction with reference to the usable character set thus results with reference to national special characters (as e.g. the German "Umlauts"), which often cannot or cannot be correctly displayed in the display components of the known systems, which are at least internally mostly geared towards the English language. In addition, the FAT file system, which is e.g. still being widely in use in older existing soft- and hardware components, restricts any file- or directory name to the (also commonly known) "8.3-Format". Besides such system related restrictions with reference to the field contents processible on known execution systems, an additional specific regulation requirement results from different specifications for field contents in management information systems and in execution systems connected therewith.

In known management information systems, address fields are e.g. provided with several lines as edit "edit text" field, wherein the particular lines are separated by page break characters (e.g. "\n"). In known execution systems, address data, however, are often being processed as a one line field.

Methods, as mentioned above, for communication between management information systems or source system, and connected execution systems in Job Definition Format, are commonly known in networked printing plants. The specific problems in communications between systems with different formats are not being solved in the specification of JDF.

The known processes on the one hand resort to the definition of restricted entry formats in the employed management information systems, or on the other hand to manual modification of the transmitted field contents directly at the execution systems, for the communication between systems with incompatible field formats. For example, the field "Descriptive Name" provided in the Job Definition Format for a one line job name, is defined as a character string without length restriction. To the contrary, the CIP4-consortium recommends in the Interoperability Conformance Specifications (ICS) for the communication of a management information system with an execution system, to keep this character string "as short as possible". As a reason it is being stated, that many display devices had only limited opportunities to display an order description.

The possibility of recipient specific rule based adaptation of field contents is basically known, as it is disclosed e.g. in U.S. Pat. No. 6,144,969 A, in the form of the adaptation of file names to the requirements of a target system. The application of this basically known process in the framework of the JDF based communication contradicts the philosophy of the CIP4-consortium and the concept of JDF based thereupon in an elementary manner, which specifically includes the use of a standardized file over the whole system and independent from the respective receiver.

It is the object of the invention to simplify the communication between management information systems or source systems and execution systems in Job Definition Format, and to make them less error prone.

SUMMARY OF THE INVENTION

Based on the known processes, it is suggested according to the invention that the field content is initially adapted according to a rule specified for the management information system, or the source system and the execution system, and subsequently transmitted to the execution system.

The application of an individualized rule for the communication between a special management information system or source system, and a special execution system to a field content stored in the management information system allows maintaining established internal business conventions for data structures and formats, which were partially proven over decades, within the management information system or source system, and simultaneously assures the compatibility of the transmitted data with requirements of the executing system. The application of the method according to the invention is thereby significantly simplified relative to the known state of the art methods.

Tying the rules for the communication with several execution systems on the side of the management information system, while processing the same job, leads to the use of various field contents, adapted to the respective execution systems, contradicting the ideal concept of the JDF file standardized over all the systems, which, on the other hand, allows the central management of these rules in a standardized format, adapted to the management information system. The configuration of the process according to the invention for communication with a plurality of various execution systems, as well as with external customers, or with subcontractors, is thus simplified considerably.

For the communication of an execution system with a source system, in which the field content is stored in a JDF file, the field content in particular can be transmitted in a field, not defined in the file, in the framework of a method according to the invention. The field can hereby also be assigned to a node not defined in the file. Furthermore, it can be predetermined in the framework of such a process according to the invention that a field defined in the file, or also a node, defined in the file, included in the field, is not transmitted.

Such method according to the invention allows a reduction of the subsystems specified for various receiver systems to a smaller number of quasi standardized JDF base formats in the framework of the communication with an execution system. The JDF files generated in such base format can subsequently be reprocessed in a rule based manner for the respective receiver system, wherein this reprocessing, since now only text files are being handled, can be implemented with simple script languages (e.g. PHP). Such method according to the invention, with two-step adaptation of JDF files, on the one hand, with a MIS and, on the other hand, through scripts, also allows in the framework of an error search (compared to multiple adaptation and recompiling of the MIS) a considerably simplified modification of the communication during ongoing operations.

According to the framework of the method according to the invention, preferably a plurality of rules specified for a respective execution system, is deposited in a configuration file, and after selection of the executing system, the field content is adapted according to the rule specified for it. In the context of parallel processing of various components of a job, e.g. simultaneously on a prepress system and on several print machines separately for cover and content, the same field content can be adapted differently, also based on the various rules specified for these executing systems.

The application of a standardized, structured configuration file serves in turn the user friendliness of the method according to the invention. The administration is simplified in particular, when the rules are stored in text format, and can be processed with an editor. Alternatively, different rules can also be stored in a respective proper file in a respective proper directory, or in a database file, e.g. in a registration database, which is proprietary to the system.

For adapting the field content in the context of a process according to the invention, a character sequence, which cannot be expressed in the format, can be transposed into a character sequence, which can be expressed in the format, a field content can be reduced to a restricted number of characters, or can be combined with an additional field content, or a structured field content, which includes a plurality of information, can be reduced to a part of this information.

In the context of a process according to the invention, the field content can be transmitted to the execution system in a private field. This is recommended e.g. when the field content for this execution system includes specific information, as e.g. access data, which identify the editor of the data transmitted in the Job Definition Format on the execution system, and which authorize him there for the access to personal or protected areas.

A method according to the invention is preferably utilized in the context of a communication module, through which a field content in Job Definition Format can be transmitted to an executing system. The definition of a closed communication module in the context of a management information system, or source system, which is connected with its other modules via defined interfaces, on the one hand, facilitates the program generation and maintenance, and additionally allows to only call up the communication module when a communication with an executing system is actually requested by the management information system, which saves resources.

DETAILED DESCRIPTION OF PREFERRED EMBODIMENTS

The invention is subsequently explained with reference to an exemplary embodiment. A screen mask for entering job data in a management information system, which communicates with an execution system according to the process according to the invention, does not have field designations, which are JDF specific, or specific to the connected execution system, or references to specific restrictions for the definition of the field contents in the management information system. Through the communication according to the process according to the invention, the field contents and their format, stored in the management information system, with the exception that the field contents have to abstractly include the information required by the connected execution systems, are independent from the format used for communication with the execution systems, and also from the format used in the connected execution systems, and required therein for useful processing of this information.

For the communication with a connected execution system, the field contents are handed over to a communication module, which assembles a JDF file from this information, which is specific for the execution system. In the context of singular instructions, the rules are defined for transposing the field contents from the management information system into the information required for processing the order in the execution system. These instructions are stored in a central configuration file in text format.

Through the definition "'% d' 1 auftragsnr", the communication module is e.g. instructed to take over the field content of a field with the designation "auftragsnr" from the management information system as a decimal figure into the fields "ID" and "JobID" of the XML-node of a JDF file, currently to be written.

Through the definitions, "'% s—%. 20 s' 2 ku_txt2 prodbez", "'% s (% d Form)' 2 j_work_code j_part" and "'% dg % dx % d' 3 j_pap_gewicht j_dbformat__1 j_dbformat_b j_dbbahn j_pap_sortname", fields for designations in various XML-nodes of the JDF file are assembled from various field contents from the management information system, according to the conventions of the execution system. The first definition mentioned above includes in particular a reduction to twenty characters.

Furthermore, the German special characters "ä", "ö", "ü", and "β", as well as "Ä", "Ö", and "Ü" are transposed from the field contents of the management information system by a communications module into the character sequences "ae", "oe", "ue", and "ss" as well as "Ae", "Oe", and "Ue" in the JDF file, punctuation marks ".", ",", ";", "!", "?" as well as "blank characters" are transposed to the underline dash "_". Several subsequent underline dashes are transposed into a single one in a second step, in order to improve the legibility of the field content.

What is claimed is:

1. A method for communication between a source system and an execution system, comprising the following steps:
   storing a content of a field in the source system in a file in job definition format;
   adapting the file in job definition format to the source system and the execution system according to a rule specified for the source system and for the execution system; and
   transmitting the adapted file in job definition format from the source system to the execution system,
   wherein a plurality of rules is stored in a configuration file, and
   wherein each rule is specified for a respective execution system from a plurality of execution systems, further comprising the steps of: selecting an execution system from the plurality of execution systems and adapting the content of the field according to the rules specified for the selected execution system.

2. The method of claim 1, wherein the content is transmitted in a field that is not defined in the file.

3. The method of claim 1, wherein the field is assigned to a node that is not defined in the file.

4. The method of claim 1, wherein a field defined in the file is not transmitted with the content.

5. The method of claim 1, wherein a node that includes the field and that is defined in the file is not transmitted with the content.

6. The method according to claim 1, wherein adapting the content transposes a character sequence that is incompatible with job definition format, into a character sequence that is compatible with job definition format.

7. The method according to claim 1, wherein adapting the content reduces the content to a restricted number of characters.

8. The method according to claim 1, wherein adapting the content combines the content with a content of another field.

9. The method according to claim 1, wherein adapting the content reduces a structured field that includes a plurality of information to a part of this plurality of information.

10. The method according to claim 1, wherein the content of the field is transmitted in a private-field.

11. A method for communication between a management information system and an execution system, comprising the following steps:
   storing a content of a field in the management information system;
   assembling the stored content according to a rule specified for the management information system and for the execution system into a file in job definition format adapted to the management information system and the execution system; and
   transmitting the adapted file in job definition format from the management information system to the execution system,
   wherein a plurality of rules is stored in a configuration file, and
   wherein each rule is specified for a respective execution system from a plurality of execution systems, further comprising the steps of: selecting an execution system from the plurality of execution systems and adapting the content of the field according to the rules specified for the selected execution system.

12. The method according to claim 11, wherein adapting the content transposes a character sequence that is incompatible with job definition format, into a character sequence that is compatible with job definition format.

13. The method according to claim 11, wherein adapting the content reduces the content to a restricted number of characters.

14. The method according to claim 11, wherein adapting the content combines the content with a content of another field.

15. The method according to claim 11, wherein adapting the content reduces a structured field that includes a plurality of information to a part of this plurality of information.

16. The method according to claim 11, wherein the content of the field is transmitted in a private-field.

17. A communication module configured to transmit a field content in job definition format to an execution system, the communication module comprising:
   receiving devices for receiving the field contents in job definition from a source system;
   storage devices for storing a rule specified for the source system and the execution system;
   adaptation devices for adapting the field content in job definition format according to the rule; and
   transmitting devices for transmitting the adapted content in job definition format to the execution system,
   wherein a plurality of rules is stored in a configuration file, and
   wherein each rule is specified for a respective execution system from a plurality of execution systems, further comprising the steps of: selecting an execution system from the plurality of execution systems and adapting the content of the field according to the rules specified for the selected execution system.

18. The communication module according to claim 17, wherein adapting the content transposes a character sequence that is incompatible with job definition format, into a character sequence that is compatible with job definition format.

19. The communication module according to claim 17, wherein adapting the content reduces the content to a restricted number of characters.

20. The communication module according to claim 17, wherein adapting the content combines the content with a content of another field.

21. The communication module according to claim 17, wherein adapting the content reduces a structured field that includes a plurality of information to a part of this plurality of information.

22. The communication module according to claim 17, wherein the content of the field is transmitted in a private-field.

* * * * *